3,285,930
ISOTHIAZOLES
Ralph P. Williams, Bartlesville, Okla., assignor to Phillips Petroleum Company, a corporation of Delaware
No Drawing. Filed Nov. 18, 1964, Ser. No. 412,238
3 Claims. (Cl. 260—302)

This invention relates to novel isothiazoles and a process for their production. In one of its aspects, this invention relates to novel halo-substituted isothiazoles. In another aspect it relates to a process for the formation of halo-substituted isothiazoles.

The isothiazole ring structure has been postulated for many years, but until very recently attempts to synthesize this heterocyclic structure were unsuccessful. In 1959 it was reported by Adams and Slack in the Journal of the American Chemical Society that the isothiazole structure had been synthesized by a procedure involving the action of either chloroamine or peroxide compounds on beta-iminothiobutyramide. However, such starting materials are not readily available, and therefore the processes heretofore developed have not been too attractive for forming the heterocyclic ring.

It is an object of this invention to provide a novel process for the preparation of 3-haloisothiazoles. It is a further object to provide a method for the synthesis of these new compounds from readily available starting materials. A still further object of the invention is to provide 3-haloisothiazoles, 3,4-dihaloisothiazoles, and 3-halo-4-nitroisothiazoles.

Other objects, aspects and the several advantages of the invention will be readily apparent to those skilled in the art from the description and the appended claims.

According to one aspect of this invention, 3-haloisothiazoles of the formula

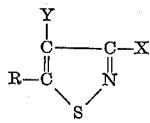

wherein X is selected from the group consisting of chlorine and bromine, Y is selected from the group consisting of R and X and each R is selected from the group consisting of hydrogen and alkyl, aryl, cycloalkyl and combinations of these radicals, such as aralkyl and alkaryl, containing from 1 to 10 carbon atoms, inclusive, are produced by contacting a 3-mercaptopropionitrile of the formula

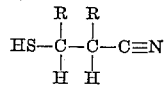

wherein R is as previously defined with elemental chlorine or bromine.

Compounds which are provided in accordance with this invention include 3-chloroisothiazole, 3,4-dichloroisothiazole, 3-bromoisothiazole, 3-bromo-5-methylisothiazole, 3-choro-4,5-dimethylisothiazole, 3-chloro-4-n-butylisothiazole, 3-bromo-5-isooctylisothiazole, 3-chloro-4,5-di-n-decylisothiazole, 3-bromo-5-phenylisothiazole, 3-chloro-4-benzylisothiazole, 3-bromo-5-cyclohexylisothiazole, 3-chloro-4-(4-phenylbutyl)isothiazole, 3,4-dibromo-5-(4-butylphenyl)isothiazole, 3-chloro-5-cyclodecylisothiazole, and 3-bromo-4-phenyl-5-(4-butylcyclohexyl)isothiazole.

In addition, nitrated products according to another aspect of this invention include 3-chloro-4-nitroisothiazole, 3-bromo-4-nitro-5-ethylisothiazole, 3-bromo-4-nitro-5-(2-methylcyclohexyl)isothiazole, 3-chloro-4-nitro-5-n-decylisothiazole, and the like.

Examples of 3-mercaptopropionitriles which are employed as reactants in the process of this invention are 3-mercaptopropionitrile, 3-mercaptobutyronitrile, 2-methyl-3-mercaptopropionitrile, 3-mercaptocapronitrile, 3-mercaptolauronitrile, 3-mercaptotridecanenitrile, 3-mercapto-2-decyltridecanenitrile, 2-cyclohexyl-3-mercaptopropionitrile, 3-mercapto-3-phenylpropionitrile, 3-mercapto-3-cyclopentyl-2-tert-butylpropionitrile, 3-mercapto-4-phenylbutyronitrile, 3 - mercapto-3-(4-n-butylphenyl)pronionitrile, 3 - mercapto-5-(2-methylcyclohexyl)valeronitrile and the like.

The process of this invention is carried out by contacting one of the above-defined 3-mercaptopropionitriles with elemental chlorine or elemental bromine in the presence of a diluent which is a solvent for the nitrile compound and which is non-reactive with the nitrile and the halogen. The reaction is carried out at a temperature generally ranging from —25 to 100° C., preferably below 50° C. The reaction time can vary widely and can range from a few minutes to several days, but will generally be less than eight hours.

Some examples of solvents which are inert with respect to the reactants and which can be advantageously employed are carbon tetrachloride, chloroform, tetrachloroethane, and the like. The amount of diluent which is used can vary widely but will generally range from about 1 to about 10 ml. per gram of 3-mercaptopropionitrile reactant.

The mol ratio of elemental chlorine or elemental bromine to mercaptonitrile reactant can also vary widely but will generally range from 0.5/1 to 5/1, preferably from 1/1 to 3/1.

The reaction is conveniently carried out by contacting a solution of nitrile in one of the above-defined diluents at the specified temperature with the elemental chlorine or bromine. The elemental chlorine can be bubbled into the solution at a rate such that it does not pass through the solution too rapidly for the reaction to occur.

The 3-haloisothiazole product can be recovered by a variety of procedures. One particularly convenient method for recovering the product is to dispel dissolved HCl or HBr, e.g. by heating. The reaction diluent can then be removed by any suitable procedure, such as vacuum stripping, after which the remaining material can be worked up by distillation, solvent extraction, crystallization, and other well-known procedures. One particularly suitable method is to distill the material remaining after solvent stripping and to dissolve the distillate in a suitable solvent followed by washing with dilute aqueous base (10 percent aqueous $Na_2CO_3$, for example) and water to remove dissolved hydrogen chloride or hydrogen bromide, and then to recover the 3-haloisothiazole by fractionating the organic phase. The residue from first distillation can be treated to recover further amounts of the product by steam distillation followed by solvent extraction. In another method of operation, the product can be recovered directly from the reaction mixture by steam distillation followed by solvent extraction and final distillation.

The 3-mercaptopropionitrile reactants of this invention are readily available materials and can be prepared, for example, by reacting hydrogen sulfide with acrylonitrile in the presence of a base to form the 3-mercaptopropionitrile.

In a further aspect of this invention, the 3-haloisothiazole compounds are nitrated to form 4-nitro-3-haloisothiazoles. Conventional nitrating agents can be utilized, i.e., reaction of the 3-haloisothiazole with a nitrating agent such as fuming nitric acid, preferably in concentrated sulfuric acid. Such nitrations are preferably effected at temperatures below 25° C. using reaction times ranging from a few minutes to several days, generally less than ten hours. The mol ratio of nitrating agent to 3-haloisothiazole will generally range from about 0.5/1 to 2/1 and more usually will approximately 1/1. Recovery of the thus produced 4-nitro-3-haloisothiazoles can be effected by the techniques described previously for recovery of the 3-haloisothiazole product.

The 3-haloisothiazoles, 3,4-dihaloisothiazoles and 3-halo-4-nitroisothiazoles of this invention are useful as pesticides and as intermediates for the preparation of materials useful as pesticides, pharmaceuticals and the like. The compounds of this invention are particularly active against chewing-type insects of the family Insecta Orthoptera, which includes locusts, grasshoppers, crickets and the like.

The following specific examples are intended to illustrate the preparation of 3-haloisothiazoles according to the inventive process, but it is not intended that the invention be limited to the specific features shown therein.

EXAMPLE I

A series of five runs was carried out in which 3-mercaptopropionitrile was reacted with elemental chlorine according to the process of this invention. In each of these runs, a chlorine/3-mercaptopropionitrile mol ratio of from approximately 1/1 to 3/1 was employed. In each of the runs, the 3-mercaptopropionitrile was dissolved in chloroform and the resulting solution was cooled to $-10$ to $-20°$ C. and contacted with the desired amount of chlorine by bubbling in the chlorine at a rate slow enough to allow the temperature to be maintained at $-10°$ C. or below. After all the chlorine had been added, the mixture was allowed to warm to approximately $10°$ C. while stirring. The reaction solution was then warmed slowly to about room temperature after which the mixture was refluxed at about 60 to 65° C. for 30 minutes.

The chloroform was then stripped from the reaction mixture under aspirator vacuum leaving a dark liquid residue which was distilled through a 10″ Vigreux column to obtain a concentrate of the product. This concentrate was then refractionated through a 20″ vacuum column to obtain a closer boiling cut of the product. The details of these five runs are given in Table I.

EXAMPLE II

The procedure of Example I was repeated except that 3-mercaptobutyronitrile was employed. The product was analyzed and found to be 3-chloro-5-methylisothiazole.

In this run, 202 grams (2 mols) of 3-mercaptobutyronitrile was dissolved in 1000 ml of chloroform and chilled to $-10°$ C. in a 2-liter, 3-necked flask. While maintaining the temperature at $-10°$ C., 284 grams (4 mols) of chlorine was bubbled into this solution over a one-hour period. The solution turned yellow when 73.5 grams of chlorine had been added and remained yellow during the addition of the remainder of the chlorine. When all the chlorine had been charged, the solution was allowed slowly to warm to room temperature following which the solution was stirred for six hours and allowed to stand overnight.

The following day the solution was heated briefly to its boiling point to expel dissolved HCl after which it was cooled and extracted two times with 200 ml. water, one time with 100 ml. of 10 percent by weight aqueous potassium carbonate, and two more times with 200 ml water in each wash. The organic phase was then dried over magnesium sulfate and the filtrate was concentrated by stripping off the solvent on a steam bath under aspirator vacuum yielding 266 grams of dark liquid residue. This residue was steam distilled until about 1500 ml. of distillate was taken overhead. The organic phase in the distillate and two 200 ml. chloroform extracts of the aqueous phase were combined, dried over $MgSO_4$ and concentrated to 190.3 grams by evaporation.

This material was then fractionated through an 8 mm. by 36″ Hypercal column to yield 143.8 grams of material boiling 50° C. at 4 mm. mercury absolute pressure and 23.8 grams of material boiling 66.5 to 68° C. at 4 mm. mercury absolute pressure.

The lower boiling fraction was examined by nuclear magnetic resonance, which confirmed the isothiazole ring structure and confirmed the presence of one methyl group and one hydrogen atom on the isothiazole ring. Since

*Table I*

| Run No. | Charge 3-mercapto propionitrile | | Chlorine Charge | | Ml. $CHCl_3$ | Chlorine Addition Time, Minutes | Grams Distillable Product | B.P. °C. at (X) mm. Hg | $n_D^{20}$ | Refractionated Material | | | | Yield 3-chloro-isothiazole Mol percent | $n_D^{20}$ |
|---|---|---|---|---|---|---|---|---|---|---|---|---|---|---|---|
| | Grams | Mols | Grams | Mols | | | | | | B.P. °C. | Press (mm.) | Grams | Mols 3-chloro-isothiazole | | |
| 1 | 164 | 1.89 | 297 | 4.2 | 1,000 | 45 | 133 | 60–70 at 20 | 1.5522 | 66–68 | 25 | 96 | 0.803 | 42.5 | 1.5519–1.5532 |
| 2 | 164 | 1.89 | 144 | 2.0 | 1,000 | 18 | 20.9 | 55–57 at 19 | 1.5375 | (¹) | (¹) | (¹) | (¹) | | 1.5528–1.5548 |
| 3 | 164 | 1.89 | 426 | 6.0 | 1,000 | 90 | 172.4 | 57–81 at 7–20.5 | 1.5555 | 68–70 | 25 | 93.7 | 0.784 | 41.5 | |
| 4 | 174 | 2.0 | 291 | 4.1 | 1,000 | 35 | 163.9 | 48–66 at 4–20 | 1.5538 | 66–70 | 25 | 116.5 | 0.975 | 48.6 | 1.5521–1.5532 |
| 5 | 435 | 5.0 | 730 | 10.3 | 1,750 | 60 | 449.1 | 59–74 at 10–20 | (²) | 64.5–67.5 | 24.5 | 396.6 | 3.32 | 66.4 | 1.5535–1.5547 |

¹ Not Refractionated.
² Not Measured.

The product from Run 1 of Table I was subjected to elemental analysis, the results of which are as follows:

| Element | Calculated weight percent for $C_3H_2ClNS$ | Found, weight percent |
|---|---|---|
| Carbon | 30.2 | 30.1 |
| Hydrogen | 1.7 | 1.77 |
| Chlorine | 29.6 | 29.2 |
| Nitrogen | 11.7 | 11.9 |
| Sulfur | 26.8 | 24.6 |

This material was analyzed by nuclear magnetic resonance which confirmed the ring structure and indicated the presence of two hydrogen atoms which were located on adjacent carbon atoms.

the methyl group in the starting reactant 3-mercaptobutyronitrile was located on the carbon adjacent the sulfur atom, the structure of this material is thus 3-chloro-5-methylisothiazole.

An elemental analysis of the 3-chloro-5-methylisothiazole gave the following results:

| Element | Calculated weight percent for $C_4H_4ClNS$ | Found, weight percent |
|---|---|---|
| Carbon | 35.96 | 36.1 |
| Hydrogen | 3.02 | 3.6 |
| Chlorine | 26.54 | 25.0 |
| Nitrogen | 10.49 | 10.7 |
| Sulfur | 24.00 | 24.3 |

Nuclear magnetic resonance of the higher boiling fraction confirmed its structure to be a dichloromethylisothiazole. Thus this compound was 3,4-dichloro-5-methylisothiazole. An elemental analysis of this material gave the following results:

| Element | Calculated weight percent for $C_4H_3Cl_2NS$ | Found, weight percent |
|---|---|---|
| Carbon | 28.59 | 29.5 |
| Hydrogen | 1.80 | 2.2 |
| Chlorine | 42.20 | 42.6 |
| Nitrogen | 8.34 | 6.9 |
| Sulfur | 19.08 | 18.7 |

EXAMPLE III

In an attempt to see if the procedure of this invention could be employed for ring closure of 4-mercaptobutyronitrile, this compound was reacted with chlorine by the procedure of Examples I and II. No product was obtained, as the material decomposed when it was attempted to distill product from the reaction solution.

EXAMPLE IV

The 3-chloroisothiazole from Run 5 of Table I was nitrated by the following procedure.

In this run, 24 grams (0.2 mol) of the 3-chloroisothiazole from Run 5 was stirred slowly into 126 ml. of concentrated sulfuric acid which had been previously cooled to 15° C. The solution temperature was kept below 30° C. while adding the 3-chloroisothiazole. The resulting solution was then cooled to 5° C. and 12 ml. of fuming nitric acid (density 1.49–1.50) was added to the solution in portions while cooling, keeping the temperature below 10° C. The stirred mixture was slowly heated to 98° C. on a steam bath and maintained at 94–98° C. for 4.3 hours. The material was then cooled and poured over 300 grams of ice. 700 ml. of water was then added to the resulting mixture, and the mixture was then extracted three times with 150 ml. ether in each extraction. The combined extracts were then washed three times with 50 ml. portions of water, one time with 100 ml. of 5 weight percent aqueous sodium bicarbonate and two times with 50 ml. portions of water. The ether phase was then dried, filtered, and the ether was stripped off under vacuum. The remaining material was distilled through a short path column. The charge to the column was 26.2 grams and 16 grams of material boiling from 103.5° C. at 3 mm. mercury absolute pressure to 93° C. at 0.5 mm. mercury was obtained, refratcive index $n_D^{20}$ 1.6087–1.6092.

An elemental analysis of this material gave the following results:

| Element | Calculated Weight Percent for $C_3HClN_2O_2S$ | Found, Weight Percent |
|---|---|---|
| Carbon | 21.9 | 21.6 |
| Hydrogen | 0.6 | 0.6 |
| Chlorine | 21.6 | 22.5 |
| Nitrogen | 17.0 | 16.1 |
| Oxygen | 19.4 | (¹) |
| Sulfur | 19.5 | 19.5 |

¹ Not Measured.

The above results are consistent with the nitrated material being 3-chloro-4-nitroisothiazole.

Reasonable variations and modifications of this invention can be made, or followed, in view of the foregoing, without departing from the spirit or scope thereof.

I claim:

1. A process for preparing compounds of the formula

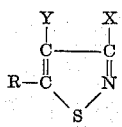

wherein R is a member selected from the group consisting of hydrogen and alkyl, aryl, cycloalkyl, aralkyl and alkaryl radicals containing from 1 to 10 carbon atoms, X is a member selected from the group consisting of chlorine and bromine, and Y is a member of the group consisting of chlorine, bromine, alkyl, aryl, cycloalkyl, aralkyl and alkaryl containing from 1 to 10 carbon atoms, comprising contacting with a compound of the group consisting of elemental chlorine and elemental bromine a 3-mercaptopropionitrile of the formula

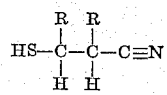

wherein R is a member selected from the group consisting of hydrogen and alkyl, aryl, cycloalkyl, aralkyl and alkaryl radicals containing from 1 to 10 carbon atoms, in the presence of a diluent and thereafter recovering the resulting isothiazole as a product of the process.

2. A process according to claim 1 wherein the temperature is in the range of −25 to 100° C.

3. A process according to claim 1 wherein the mol ratio of halogen to mercaptonitrile is in the range of 0.5/1 to 5/1.

References Cited by the Examiner

FOREIGN PATENTS 629,580  10/1963  Belgium.

OTHER REFERENCES

Adams et al.: J. Chem. Soc. (London), 1959, pp. 3061–72.

Huebenett et al., Angew. Chem., volume 75 (1963), pp. 1189–93.

ALEX MAZEL, *Primary Examiner.*

HENRY R. JILES, *Examiner.*

RICHARD J. GALLAGHER, *Assistant Examiner.*